United States Patent
Xu et al.

(10) Patent No.: US 10,415,457 B2
(45) Date of Patent: Sep. 17, 2019

(54) BOOST CONTROL TECHNIQUES FOR A TURBOCHARGED ENGINE WITH SCAVENGING

(71) Applicants: Shuonan Xu, Troy, MI (US); David A Lawrence, Lake Orion, MI (US); Ethan E Bayer, Lake Orion, MI (US)

(72) Inventors: Shuonan Xu, Troy, MI (US); David A Lawrence, Lake Orion, MI (US); Ethan E Bayer, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 121 days.

(21) Appl. No.: 15/805,335

(22) Filed: Nov. 7, 2017

(65) Prior Publication Data

US 2019/0136747 A1 May 9, 2019

(51) Int. Cl.
*F02D 9/02* (2006.01)
*F02B 33/40* (2006.01)
(Continued)

(52) U.S. Cl.
CPC ............ *F02B 33/40* (2013.01); *F02B 37/183* (2013.01); *F02D 9/02* (2013.01); *F02D 11/105* (2013.01);
(Continued)

(58) Field of Classification Search
CPC ............................................. F02B 37/18–186
See application file for complete search history.

(56) References Cited

U.S. PATENT DOCUMENTS 7,621,126 B2 11/2009 Kolmanovsky et al.
9,175,629 B2 * 11/2015 Cunningham ........ F02D 41/006
(Continued)

FOREIGN PATENT DOCUMENTS

DE 102007000088 A1 * 8/2007 ......... F02D 41/0007

OTHER PUBLICATIONS

Karnik A Y et al., "Electronic Throttle and Caste Gate Control for Turbocharged Gasoline Engines", American Control Conference, 2005. Proceeds of the 2005 Portland, OR, US, Jun. 8-10, 2005, IEEE, Piscataway, NJ US, Jun. 8, 2005, pp. 4434-4439.
(Continued)

*Primary Examiner* — Laert Dounis
(74) *Attorney, Agent, or Firm* — Ralph E. Smith

(57) ABSTRACT

Techniques for setting a boost target for a turbocharged engine comprise (i) operating the engine in a scavenging mode such that opening of intake and exhaust valves of cylinders of the engine overlap and (ii) while transitioning the engine in/out of the scavenging mode: determining an engine torque request, creating a torque reserve by setting independent targets for throttle inlet pressure (TIP) and intake manifold absolute pressure (MAP), determining a target TIP based on a target total air charge, engine speed, and a previously-determined target engine volumetric efficiency (VE), controlling a wastegate valve based on the target TIP, determining a target MAP based on the engine torque request, and controlling a throttle valve based on the target MAP. During steady-state scavenging operation, the controller calculates a conventional target TIP based on the engine torque request and controls the wastegate valve based on the conventionally calculated target TIP.

20 Claims, 4 Drawing Sheets

(51) Int. Cl.
- *F02B 37/18* (2006.01)
- *F02D 11/10* (2006.01)
- *F02D 13/02* (2006.01)
- *F02D 41/00* (2006.01)
- *F02D 41/14* (2006.01)

(52) U.S. Cl.
CPC ..... *F02D 13/0261* (2013.01); *F02D 41/0007* (2013.01); *F02D 41/1446* (2013.01); *F02D 41/1454* (2013.01); *F02D 2041/141* (2013.01); *F02D 2200/021* (2013.01); *F02D 2200/023* (2013.01); *F02D 2200/0402* (2013.01); *F02D 2200/0411* (2013.01); *F02D 2200/0802* (2013.01); *F02D 2200/101* (2013.01); *Y02T 10/144* (2013.01)

(56) References Cited

U.S. PATENT DOCUMENTS

| | | | |
|---|---|---|---|
| 9,797,318 B2* | 10/2017 | Storch | F02D 28/00 |
| 10,161,323 B2* | 12/2018 | Sager | F02D 41/0275 |
| 10,221,794 B1* | 3/2019 | Attard | F02D 41/18 |
| 10,233,854 B1* | 3/2019 | Attard | F02D 41/1447 |
| 2004/0118117 A1 | 6/2004 | Hartman et al. | |
| 2009/0018751 A1 | 1/2009 | Buckland et al. | |
| 2011/0225967 A1 | 9/2011 | Karnik et al. | |
| 2011/0314807 A1* | 12/2011 | Karnik | F02B 37/183 60/602 |
| 2015/0275771 A1 | 10/2015 | Pochner et al. | |
| 2016/0123252 A1* | 5/2016 | Yoshizaki | F02D 41/107 123/436 |
| 2016/0131054 A1 | 5/2016 | Ulrey et al. | |
| 2017/0350338 A1* | 12/2017 | Sugihira | F02D 41/10 |

OTHER PUBLICATIONS

International Search Report and Written Opinion dated Feb. 12, 2019 for International Application No. PCT/US2018/058822, International Filing Date Nov. 2, 2018.

* cited by examiner

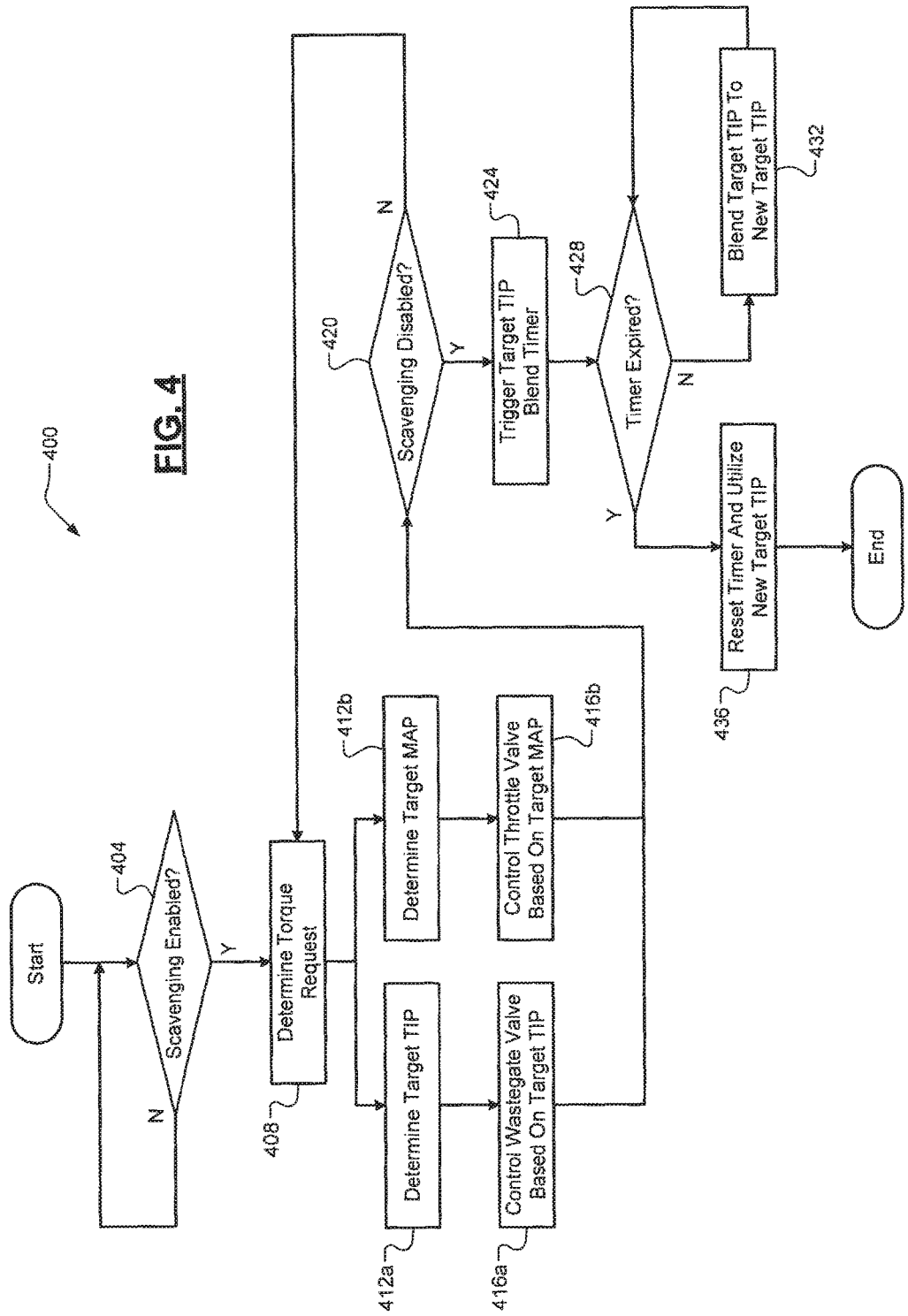

BOOST CONTROL TECHNIQUES FOR A TURBOCHARGED ENGINE WITH SCAVENGING

FIELD

The present application generally relates to turbocharged engines and, more particularly, to boost control techniques for a turbocharged engine with scavenging.

BACKGROUND

An internal combustion engine combusts a mixture of air and fuel within cylinders to generate drive torque at a crankshaft. Scavenging refers to an operating mode of the engine where a specific overlap of the cylinder intake and exhaust valves being open is commanded such that cylinder delta pressure between the intake and exhaust forces the air charge to blow through the cylinder and exit via the exhaust valve. Scavenging operation potentially increases engine performance at certain operating conditions, such as low engine speeds when exhaust energy available for a turbocharger is low. For example, scavenging affects exhaust gas dynamics, which in turn improves boost response at the turbocharger. Engine flow control valves (throttle valve, wastegate valve, etc.) are typically controlled based on related air/exhaust flow set points. Scavenging operation causes the volumetric efficiency (VE) of the engine to change, which potentially causes these engine flow set points to fluctuate. As a result, the flow control valves fight against each other, which decreases transient response of the engine. Accordingly, while such engine control systems work well for their intended purpose, there remains a need for improvement in the relevant art.

SUMMARY

According to one example aspect of the invention, a control system for a vehicle powertrain including an engine and at least one turbocharger is presented. In one exemplary implementation, the system comprises: a throttle valve configured to control a flow of air through an induction system and into an intake manifold of the engine; a wastegate valve configured to control exhaust flow through a turbine of the turbocharger, wherein the turbocharger further comprises a turbine-driven compressor that forces the air through the induction system; and a controller configured to operate the engine in a scavenging mode, such that opening of intake and exhaust valves of cylinders of the engine overlap, and while operating the engine in the scavenging mode: determine a torque request for the engine; determine a target throttle inlet pressure (TIP) based on a target total air charge, a speed of the engine, and a previously-determined target volumetric efficiency (VE) for the engine; control the wastegate valve based on the target TIP; determine a target intake manifold absolute pressure (MAP) based on the engine torque request; and control the throttle valve based on the target MAP.

In some implementations, the controller is further configured to determine the target TIP based on an inverse speed density calculation using the target total air charge, the engine speed, and the previously-determined target VE for the engine. In some implementations, the controller is configured to determine a target VE for the engine for a subsequent determination of the target TIP by: determining a target pressure ratio by dividing the target TIP by a barometric pressure; and determining the target VE using a calibrated wide open throttle (WOT) surface relating the target pressure ratio and the engine speed to the target VE for the engine. In some implementations, the target TIP and the target MAP are independent set points.

In some implementations, the controller is configured to determine the target MAP based on the engine torque request such the target MAP is derived from the torque request so that torque overshoot due to increased VE is avoided through a torque reserve, where TIP is higher than MAP while operating in the scavenging mode. In some implementations, the controller is further configured to: transition the engine into the scavenging mode in response to detecting an enable condition for the scavenging mode; and detect the enable condition for the scavenging mode when: the target TIP is greater than a target TIP threshold; a delta TIP is greater than a delta TIP threshold, the delta TIP being a difference between the target TIP and an actual TIP; the engine speed is within an engine speed range; each of a set of engine temperatures is within a respective engine temperature range; and an exhaust gas oxygen sensor is functioning properly. In some implementations, the controller is further configured to: determine when to transition the engine out of the scavenging mode; and in response to determining to transition the engine out of the scavenging mode, gradually transitioning from the target TIP to a conventionally calculated target TIP in controlling the wastegate valve, wherein the conventionally calculated target TIP is based on the engine torque request.

In some implementations, the controller is further configured to: detect a disable condition for the scavenging mode based on the target TIP, the delta TIP, engine speed, and the set of engine temperatures; and determine to transition the engine out of the scavenging mode in response to detecting the disable condition for the scavenging mode. In some implementations, the controller is configured to detect the disable condition when at least one of: the target TIP is less than the target TIP threshold; the delta TIP is less than the delta TIP threshold; the engine speed is outside of the engine speed range; and at least one of the set of engine temperatures is outside of its respective engine temperature range. In some implementations, the set of engine temperatures comprises exhaust gas temperature, exhaust catalyst temperature, engine oil temperature, and engine coolant temperature.

According to another example aspect of the invention, a method of setting a boost target for an engine and at least one turbocharger is presented. In one exemplary implementation, the method comprises operating, by a controller of the vehicle, the engine in a scavenging mode such that opening of intake and exhaust valves of cylinders of the engine overlap; and while operating the engine in the scavenging mode: determining, by the controller, a torque request for the engine; determining, by the controller, a target TIP based on a target total air charge, a speed of the engine, and a previously-determined target VE for the engine; controlling, by the controller, a wastegate valve based on the target TIP, the wastegate valve being configured to control exhaust flow through a turbine of the turbocharger, wherein the turbocharger further comprises a turbine-driven compressor that forces the air through the induction system; determining, by the controller, a target MAP based on the engine torque request; and controlling, by the controller, a throttle valve based on the target MAP, the throttle valve being configured to control a flow of air through an induction system and into an intake manifold of the engine.

In some implementations, determining the target TIP is based on an inverse speed density calculation using the target total air charge, the engine speed, and the previously-determined target VE for the engine. In some implementations, the method further comprises determining, by the controller, a target VE for the engine for a subsequent determination of the target TIP by: determining a target pressure ratio by dividing the target TIP by a barometric pressure; and determining the target VE using a calibrated WOT surface relating the target pressure ratio and the engine speed to the target VE for the engine. In some implementations, determining the target MAP based on the engine torque request is performed such that the target MAP is derived from the torque request so that torque overshoot due to increased VE is avoided through a torque reserve, where TIP is higher than MAP while operating in the scavenging mode. In some implementations, the target TIP and the target MAP are independent set points.

In some implementations, the method further comprises: transitioning, by the controller, the engine into the scavenging mode in response to detecting an enable condition for the scavenging mode; and detecting, by the controller, the enable condition for the scavenging mode when: the target TIP is greater than a target TIP threshold; a delta TIP is greater than a delta TIP threshold, the delta TIP being a difference between the target TIP and an actual TIP; the engine speed is within an engine speed range; each of a set of engine temperatures is within a respective engine temperature range; and an exhaust gas oxygen sensor is functioning properly. In some implementations, the method further comprises: determining, by the controller, when to transition the engine out of the scavenging mode; and in response to determining to transition the engine out of the scavenging mode, gradually transitioning, by the controller, from the target TIP to a conventionally calculated target TIP in controlling the wastegate valve, wherein the conventionally calculated target TIP is based on the engine torque request.

In some implementations, the method further comprises: detecting, by the controller, a disable condition for the scavenging mode based on the target TIP, the delta TIP, engine speed, and the set of engine temperatures; and determining, by the controller, to transition the engine out of the scavenging mode in response to detecting the disable condition for the scavenging mode. In some implementations, the controller detects the disable condition when at least one of: the target TIP is less than the target TIP threshold; the delta TIP is less than the delta TIP threshold; the engine speed is outside of the engine speed range; and at least one of the set of engine temperatures is outside of its respective engine temperature range. In some implementations, the set of engine temperatures comprises exhaust gas temperature, exhaust catalyst temperature, engine oil temperature, and engine coolant temperature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a flow diagram of an example method of setting a boost target for the engine according to the principles of the present disclosure.

DETAILED DESCRIPTION

As previously discussed, air/exhaust flow set points for controlling engine flow control valves (throttle valve, wastegate valve, etc.) potentially fluctuate while a turbocharged engine is transitioning in/out of scavenging. In some implementations, the throttle valve is controlled based on a target intake manifold absolute pressure (MAP). The target MAP, however, can fluctuate as a result of the change in the volumetric efficiency (VE) of the engine while transitioning in/out of scavenging. This is because VE dynamics are faster than turbocharger dynamics. The target MAP fluctuations also cause the target throttle inlet pressure (TIP) to fluctuate. In some implementations, the wastegate valve is controlled based on the target TIP, so the fluctuations in the target TIP could cause the wastegate valve to struggle. All of this results in decreased transient performance of the turbocharged engine.

Accordingly, boost control techniques for turbocharged engines with scavenging are presented. These techniques achieve improved transient response by utilizing independent set points for throttle valve and wastegate valve control such that these components don't fight with each other while the engine is transitioning in/out of scavenging. While operating the engine in a scavenging mode, a controller of the vehicle determines a feedforward target TIP based on a target total air charge, engine speed, and a previously-determined target VE. The controller utilizes this target TIP to control the wastegate valve. The controller also determines a target MAP based on a torque request for the engine and utilizes this target MAP to control the throttle valve. Since the target MAP is derived from the torque request, torque overshoot due to increased VE can be avoided through a torque reserve, where TIP is higher than MAP. When transitioning out of scavenging, the target TIP is blended into a conventionally calculated target TIP based on the engine torque request (e.g., speed density and a current VE modeled by a gas flow estimation algorithm).

Figure 1:
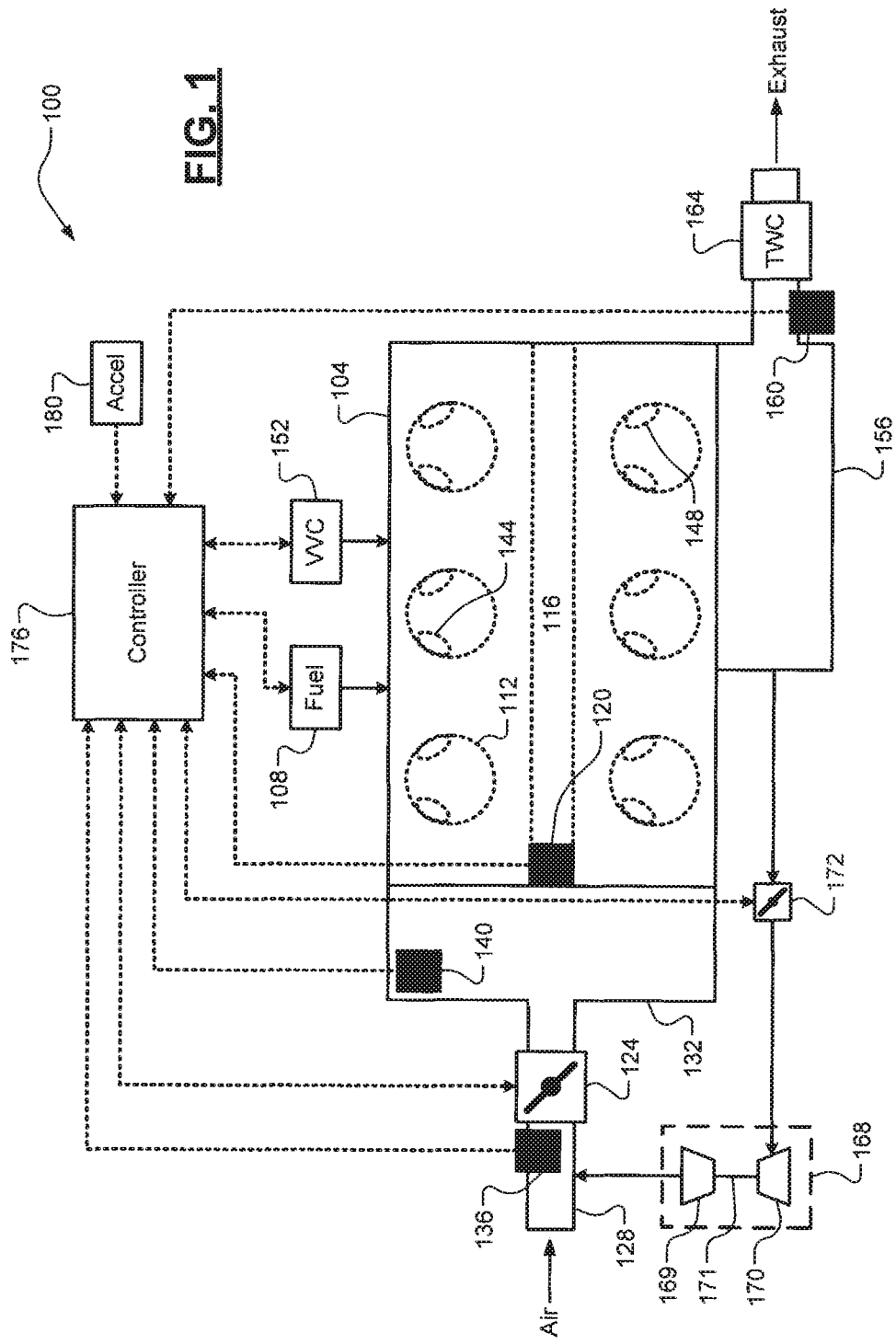
FIG. 1 is a diagram of an example vehicle powertrain according to the principles of the present disclosure.

Referring now to FIG. 1, an example vehicle powertrain 100 is illustrated. The vehicle powertrain 100 includes an engine 104 that combusts a mixture of air and fuel (e.g., gasoline) from fuel injectors 108 within cylinders 112 (e.g., using spark plugs, not shown) to drive pistons (not shown) that generate drive torque at a crankshaft 116. An engine speed sensor 120 is configured to measure a rotational speed of the crankshaft 116. A throttle valve 124 controls the flow of air through an induction system 128 and into an intake manifold 132. An air charge flowing into each cylinder 112 is modeled or determined based on measurements from one or more airflow sensors. Non-limiting examples of these airflow sensors are a TIP sensor 136 that measures a pressure at an inlet of the throttle valve 124 and an intake manifold absolute pressure (MAP) sensor 140 that measures a pressure of air in the intake manifold 132.

Intake and exhaust valves 144, 148 control the flow of air and exhaust in and out of each respective cylinder 112. The specific opening/closing of the intake and exhaust valves 144, 148 is controlled by a variable valve control (VVC) system 152 that controls lift and/or timing of the intake and exhaust valves 144, 148. In one exemplary implementation, the VVC system 152 could switch a different profile camshaft or camshafts (not shown) to operate the engine 104 in the scavenging mode. For example, the scavenging camshaft profile could be a specific camshaft profile for wide-open throttle (WOT) operation. Alternatively, the intake and exhaust valves 144, 148 could be electronically controlled by the VVC system 152 to dynamically control the opening of the overlap of the intake and exhaust valves 144, 148 and thereby control the scavenging ratio of the engine 104. The exhaust gas is expelled from the cylinders 112 into an exhaust system 156 that treats the exhaust gas to reduce emissions prior to its release into the atmosphere.

An exhaust O2 sensor 160 (e.g., a wide range O2, or WRO2 sensor) measures an amount of oxygen in the exhaust gas. While a single exhaust O2 sensor 160 is illustrated, it will be appreciated that a plurality of exhaust O2 sensors could be implemented (e.g., upstream and downstream from a catalyst 164). In one exemplary implementation, the catalyst 164 is a three-way catalytic converter or TWC. A turbocharger system 168 comprising at least one turbocharger is configured to utilize the kinetic energy of the exhaust gas to drive a compressor 169 via a turbine 170 and a shaft 171 to force more air into the engine 104 via the induction system 128. A wastegate valve 172 is configured to control exhaust flow through the turbine 170, which allows for regulation of the boost pressure produced by the turbocharger system 168. A controller 176 controls operation of the vehicle powertrain 100, including airflow (via the throttle valve 124), fuel (via the fuel injectors 108), and the turbocharger system 168 (e.g., boost pressure via the wastegate valve 172). An accelerator pedal 180 or other suitable device provides an input to the controller 176 indicative of a torque request for the engine 104.

The controller 176 also performs at least a portion of the techniques of the present disclosure, which are discussed in greater detail below. It will be appreciated that the term "controller" as used herein refers to any suitable control device or set of multiple control devices (e.g., a control system) that is/are configured to perform at least a portion of the techniques of the present disclosure. Non-limiting examples of the controller include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Figure 2:
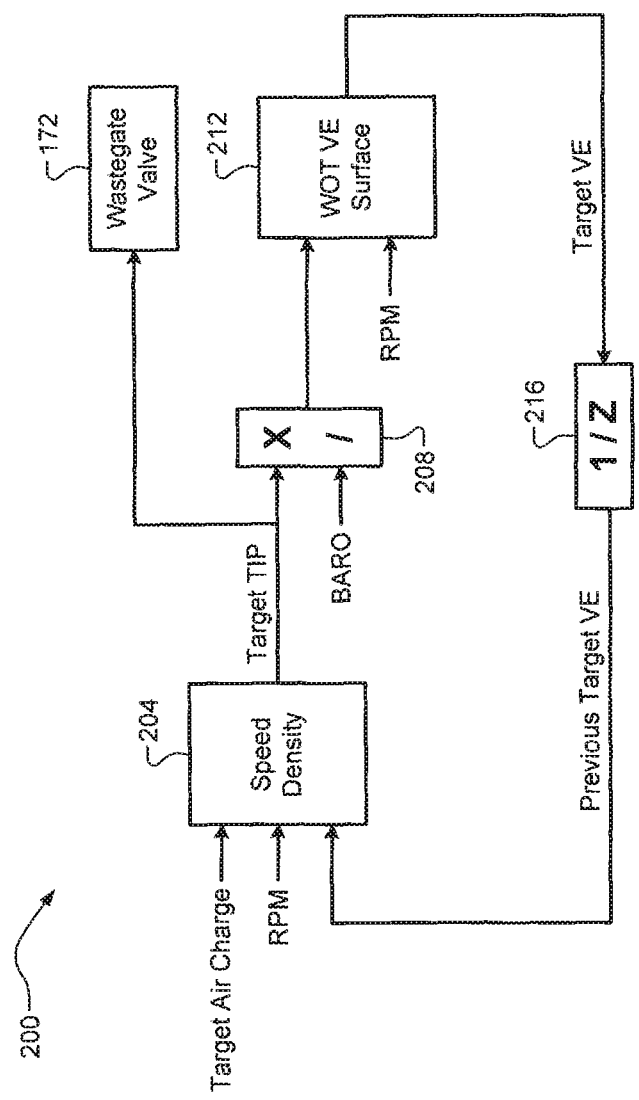
FIG. 2 is a functional block diagram of an example feedforward throttle inlet pressure (TIP) determination architecture according to the principles of the present disclosure.

Referring now to FIG. 2, a functional block diagram of an example architecture 200 for determining the feedforward target TIP is illustrated. This architecture 200 could be implemented, for example, within the controller 176. A speed density calculation routine 204 receives a target total air charge, engine speed RPM (e.g., from engine speed sensor 120), and a target VE for the engine 104 from a previous step or iteration (discussed in greater detail below). In one implementation, the target total air charge is based on an engine torque request (e.g., based on the position or depression of the accelerator pedal 180) as well as trapping efficiency (e.g., the inverse of the scavenging ratio), which represents a percentage of air mass inside the cylinder at intake valve closing. Based on these inputs, the speed density calculation routine 204 calculates an inverse speed density to output a target TIP. This target TIP is utilized to control the wastegate valve 172.

A target pressure ratio calculation 208 also receives the target TIP and a barometric pressure BARO (e.g., from a barometric pressure sensor, not shown) and divides the target TIP by the barometric pressure to obtain a target pressure ratio. A WOT VE calculation 212 receives the target pressure ratio and the engine speed RPM and utilizes a calibrated two-dimensional WOT VE surface based on these inputs to output a target VE for the engine 104. This target VE is able to be calculated using the two-dimensional surface because the engine 104 and the camshaft profiles are assumed to be at WOT conditions during the scavenging mode. At WOT conditions, the camshaft profile is uniquely defined by pressure ratio and engine speed, which makes the VE calculation much simpler. This is in contrast to a more conventional current VE calculation, which could be performed using a much more complex gas flow estimation algorithm using air charge, engine speed, and camshaft positions as inputs. As discussed above, the target VE is then utilized in a subsequent calculation of the target TIP (see delay block 216).

Figure 3A:
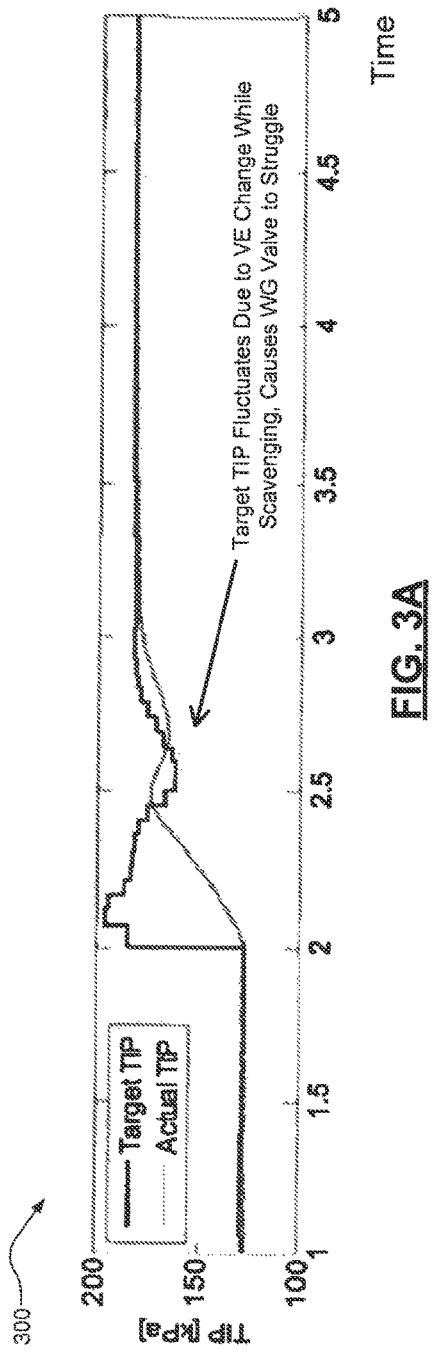
FIGS. 3A-3B are example plots of target TIP based wastegate valve control and target intake manifold absolute pressure (MAP) based throttle valve control to create a torque reserve according to the principles of the present disclosure.
Figure 3B:
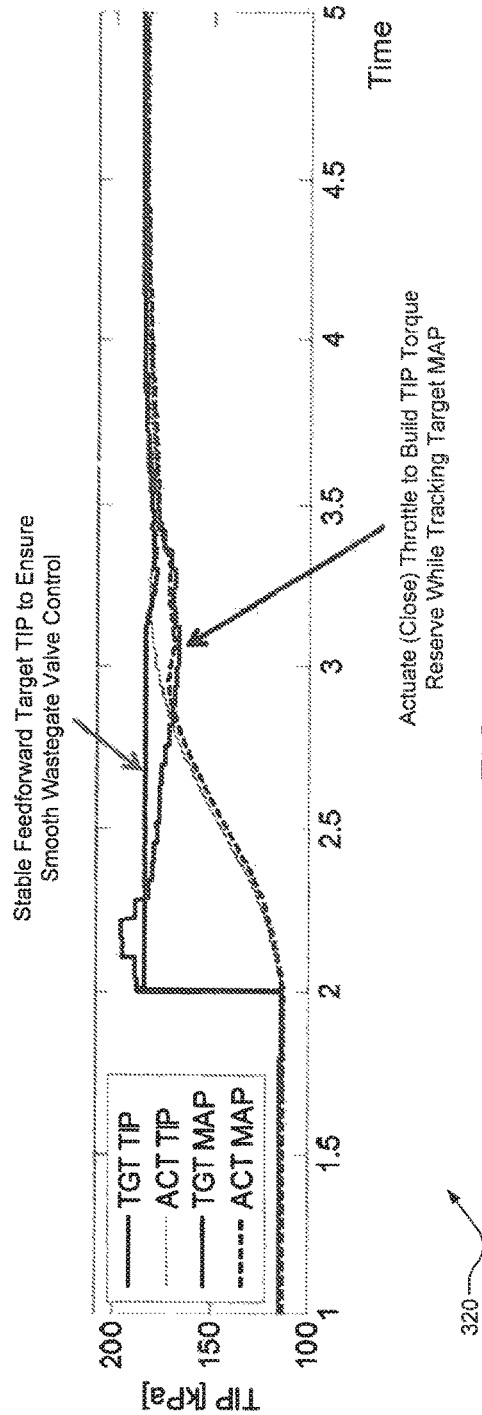

Referring now to FIGS. 3A-3B, example plots 300, 320 of throttle and wastegate valve control techniques are illustrated. FIG. 3A illustrates the fluctuations in the target TIP due to VE changes while scavenging, which causes the wastegate (WG) valve 172 to struggle to track the target TIP for the engine 104. FIG. 3B, on the other hand, illustrates feedforward target TIP based wastegate valve control and target MAP (torque request) based throttle valve control according to the present disclosure is illustrated. As shown, the target TIP (TGT TIP) is a stable feedforward target TIP that ensures smooth control of the wastegate valve 172. The target MAP (TGT MAP), which is based on the engine torque request and is an independent set point from the target TIP, is utilized to control the throttle valve 124. As shown, the throttle valve 124 is able to be actuated (closed) to create a TIP torque reserve while still accurately tracking the target MAP. This TIP torque reserve allows the system to avoid overshoots in the output torque of the engine 104 due to the engine's increased VE while scavenging.

Referring now to FIG. 4, a flow diagram of an example method 400 of setting a boost target for the engine 104 is illustrated. At 404, the controller 176 determines whether scavenging is enabled. The enabling of scavenging is based on a variety of conditions being satisfied. In one exemplary implementation, the engine 104 may only be allowed to enter the scavenging mode when engine coolant temperature (ECT) and engine oil temperature are above respective low temperature thresholds and the exhaust O2 sensor 160 is functioning properly (e.g., based on a diagnostic). There could also be additional conditions for enabling/disabling scavenging. In one exemplary implementation, the following conditions must all be satisfied for the engine 104 to enter the scavenging mode: (1) the target TIP is above a target TIP threshold, (2) a delta TIP (difference between the target and actual TIP, e.g., as measured by the TIP sensor 136) is greater than a delta TIP threshold, the engine speed is within an engine speed limit (between low/high thresholds), and a set of engine temperatures are within respective limits (between low/high thresholds).

In one exemplary implementation, the set of engine temperatures comprises exhaust gas temperature, a temperature of the catalyst 164, engine oil temperature, and ECT.

Each of these temperatures could be measured or modeled. The disable condition for exiting the scavenging mode may be similar to the enable condition. In one exemplary implementation, any of the following conditions could be satisfied for the engine 104 to exit the scavenging mode: (1) target TIP less than the target TIP threshold, (2) delta TIP less than the delta TIP threshold, (3) engine speed exceeding an engine speed threshold or limit, and (4) any of the set of engine temperatures exceeding respective temperature thresholds or limits. It will be appreciated that hysteresis could be applied to the monitored parameters for the disable condition such that the scavenging mode is not being entered and exited repeatedly over a short period. It will also be appreciated that different combinations of the parameters discussed above as well as fewer or additional parameters could be utilized for enabling/disabling the scavenging mode of the engine 104.

When scavenging is enabled, the method 400 proceeds to 408. Otherwise, the method 400 ends or returns to 404. At 408, the controller 176 determines a torque request for the engine 104 (e.g., based on input via the accelerator pedal 180). The controller 176 then performs coordinated throttle and wastegate valve control based on independent set points as illustrated by parallel paths 412a/416a and 412b/416b. At 412a, the controller 176 determines the target TIP as previously discussed herein and at 412b, the controller 176 determines the target MAP based on the engine torque request. At 416a, the controller 176 controls the wastegate valve 172 based on the target TIP and at 416b, the controller 176 controls the throttle valve 124 based on the target MAP. This throttle valve control could involve creating the TIP torque reserve as previously discussed herein.

At 420, the controller 176 determines whether scavenging is disabled or disabling of (exiting) scavenging is imminent. If true, the method 400 proceeds to 424. Otherwise, the method 400 ends or returns to 408. At 424, the controller 176 triggers a target TIP blend timer. This timer represents a period during which the target TIP is blended to a new target TIP (e.g., a conventional target TIP based on the engine torque request). This timer could be predetermined or calibrated based on operating parameters and/or engine configuration. At 428, the controller 176 determines whether the timer has expired. If true, the method 400 proceeds to 436 where the timer is reset and the new target TIP is utilized for wastegate valve control and the method 400 ends or returns to 404. If false, the method 400 proceeds to 432 where the blending from the target TIP to the new target TIP for wastegate valve control continues and the method 400 returns to 428 to determine whether the timer has expired.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle powertrain including an engine and at least one turbocharger, the system comprising:
    a throttle valve configured to control a flow of air through an induction system and into an intake manifold of the engine;
    a wastegate valve configured to control exhaust flow through a turbine of the turbocharger, wherein the turbocharger further comprises a turbine-driven compressor that forces the air through the induction system; and
    a controller configured to operate the engine in a scavenging mode, such that opening of intake and exhaust valves of cylinders of the engine overlap, and while operating the engine in the scavenging mode:
        determine a torque request for the engine;
        determine a target throttle inlet pressure (TIP) based on a target total air charge, a speed of the engine, and a previously-determined target volumetric efficiency (VE) for the engine;
        control the wastegate valve based on the target TIP;
        determine a target intake manifold absolute pressure (MAP) based on the engine torque request; and
        control the throttle valve based on the target MAP.

2. The system of claim 1, wherein the controller is further configured to determine the target TIP based on an inverse speed density calculation using the target total air charge, the engine speed, and the previously-determined target VE for the engine.

3. The system of claim 2, wherein the controller is configured to determine a target VE for the engine for a subsequent determination of the target TIP by:
    determining a target pressure ratio by dividing the target TIP by a barometric pressure; and
    determining the target VE using a calibrated wide open throttle (WOT) surface relating the target pressure ratio and the engine speed to the target VE for the engine.

4. The system of claim 1, wherein the controller is configured to determine the target MAP based on the engine torque request such the target MAP is derived from the torque request so that torque overshoot due to increased VE is avoided through a torque reserve, where TIP is higher than MAP while operating in the scavenging mode.

5. The system of claim 1, wherein the controller is further configured to:
    transition the engine into the scavenging mode in response to detecting an enable condition for the scavenging mode; and
    detect the enable condition for the scavenging mode when:
        the target TIP is greater than a target TIP threshold;
        a delta TIP is greater than a delta TIP threshold, the delta TIP being a difference between the target TIP and an actual TIP;
        the engine speed is within an engine speed range;
        each of a set of engine temperatures is within a respective engine temperature range; and
        an exhaust gas oxygen sensor is functioning properly.

6. The system of claim 5, wherein the controller is further configured to:
    determine when to transition the engine out of the scavenging mode; and
    in response to determining to transition the engine out of the scavenging mode, gradually transitioning from the target TIP to a conventionally calculated target TIP in controlling the wastegate valve, wherein the conventionally calculated target TIP is based on the engine torque request.

7. The system of claim 6, wherein the controller is further configured to:
    detect a disable condition for the scavenging mode based on the target TIP, the delta TIP, engine speed, and the set of engine temperatures; and
    determine to transition the engine out of the scavenging mode in response to detecting the disable condition for the scavenging mode.

8. The system of claim 7, wherein the controller is configured to detect the disable condition when at least one of:
the target TIP is less than the target TIP threshold;
the delta TIP is less than the delta TIP threshold;
the engine speed is outside of the engine speed range; and
at least one of the set of engine temperatures is outside of its respective engine temperature range.

9. The system of claim 8, wherein the set of engine temperatures comprises exhaust gas temperature, exhaust catalyst temperature, engine oil temperature, and engine coolant temperature.

10. The system of claim 1, wherein the target TIP and the target MAP are independent set points.

11. A method of setting a boost target for a vehicle engine having at least one turbocharger, the method comprising:
operating, by a controller of the vehicle, the engine in a scavenging mode such that opening of intake and exhaust valves of cylinders of the engine overlap; and
while operating the engine in the scavenging mode:
  determining, by the controller, a torque request for the engine;
  determining, by the controller, a target throttle inlet pressure (TIP) based on a target total air charge, a speed of the engine, and a previously-determined target volumetric efficiency (VE) for the engine;
  controlling, by the controller, a wastegate valve based on the target TIP, the wastegate valve being configured to control exhaust flow through a turbine of the turbocharger, wherein the turbocharger further comprises a turbine-driven compressor that forces the air through the induction system;
  determining, by the controller, a target intake manifold absolute pressure (MAP) based on the engine torque request; and
  controlling, by the controller, a throttle valve based on the target MAP, the throttle valve being configured to control a flow of air through an induction system and into an intake manifold of the engine.

12. The method of claim 11, wherein determining the target TIP is based on an inverse speed density calculation using the target total air charge, the engine speed, and the previously-determined target VE for the engine.

13. The method of claim 12, further comprising determining, by the controller, a target VE for the engine for a subsequent determination of the target TIP by:
determining a target pressure ratio by dividing the target TIP by a barometric pressure; and
determining the target VE using a calibrated wide open throttle (WOT) surface relating the target pressure ratio and the engine speed to the target VE for the engine.

14. The method of claim 11, wherein determining the target MAP based on the engine torque request is performed such that the target MAP is derived from the torque request so that torque overshoot due to increased VE is avoided through a torque reserve, where TIP is higher than MAP while operating in the scavenging mode.

15. The method claim 11, further comprising:
transitioning, by the controller, the engine into the scavenging mode in response to detecting an enable condition for the scavenging mode; and
detecting, by the controller, the enable condition for the scavenging mode when:
  the target TIP is greater than a target TIP threshold;
  a delta TIP is greater than a delta TIP threshold, the delta TIP being a difference between the target TIP and an actual TIP;
  the engine speed is within an engine speed range;
  each of a set of engine temperatures is within a respective engine temperature range; and
  an exhaust gas oxygen sensor is functioning properly.

16. The method of claim 15, further comprising:
determining, by the controller, when to transition the engine out of the scavenging mode; and
in response to determining to transition the engine out of the scavenging mode, gradually transitioning, by the controller, from the target TIP to a conventionally calculated target TIP in controlling the wastegate valve, wherein the conventionally calculated target TIP is based on the engine torque request.

17. The method of claim 16, further comprising:
detecting, by the controller, a disable condition for the scavenging mode based on the target TIP, the delta TIP, engine speed, and the set of engine temperatures; and
determining, by the controller, to transition the engine out of the scavenging mode in response to detecting the disable condition for the scavenging mode.

18. The method of claim 17, wherein the controller detects the disable condition when at least one of:
the target TIP is less than the target TIP threshold;
the delta TIP is less than the delta TIP threshold;
the engine speed is outside of the engine speed range; and
at least one of the set of engine temperatures is outside of its respective engine temperature range.

19. The method of claim 18, wherein the set of engine temperatures comprises exhaust gas temperature, exhaust catalyst temperature, engine oil temperature, and engine coolant temperature.

20. The method of claim 11, wherein the target TIP and the target MAP are independent set points.

* * * * *